J. S. PORTER.
TOOL FOR OPERATING SPLIT WHEEL RIMS.
APPLICATION FILED JUNE 26, 1918.
1,406,680.
Patented Feb. 14, 1922.
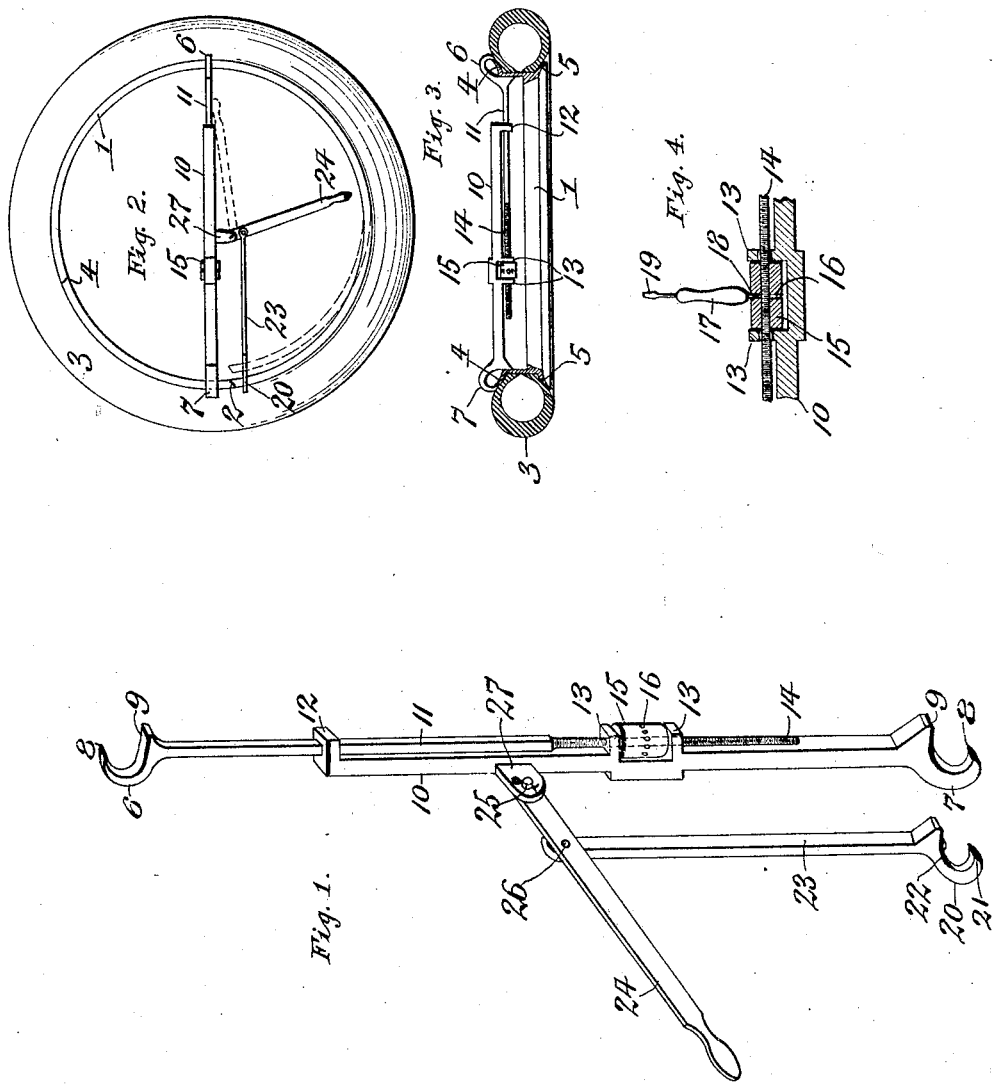
INVENTOR
James S. Porter
BY
ATTORNEYS

UNITED STATES PATENT OFFICE.

JAMES S. PORTER, OF BUFFALO, NEW YORK.

TOOL FOR OPERATING SPLIT WHEEL RIMS.

1,406,680. Specification of Letters Patent. Patented Feb. 14, 1922.

Application filed June 26, 1918. Serial No. 242,017.

*To all whom it may concern:*

Be it known that I, JAMES S. PORTER, a citizen of the United States, residing at Buffalo, in the county of Erie and State of New York, have invented new and useful Improvements in Tools for Operating Split Wheel Rims, of which the following is a specification.

This invention relates to a tool for operating the rims of wheels in which the tire supporting rims are split and require one end of the rim to be contracted relatively to the other preparatory to removing the tire therefrom and again expanded into its normal position after the tire has been restored for the purpose of holding the same in place.

It is the object of this invention to provide a tool whereby this expansion and contraction of the split rim may be effected easily and conveniently so as to permit the removal and replacement of the tire to be effected expeditiously and without undue labor.

In the accompanying drawings: Figure 1 is a perspective view of a tool for operating split rims embodying my invention. Figure 2 is a side elevation showing my improved rim operating tool applied to a split rim and tire. Figure 3 is a cross section of the same. Figure 4 is a fragmentary longitudinal section, on an enlarged scale, showing the means for clamping the tool on the rim.

Similar characters of reference indicate corresponding parts throughout the several views.

1, in Fig. 2, represents the wheel rim which is provided at one point in its circumference with a transverse split or joint 2, and 3 the tire which is mounted on the periphery of this rim and confined against longitudinal movement thereon by circumferential flanges 4, 5, arranged on opposite edges of the rim and engaging with opposite sides of the base of the tire-shoe, this construction being usual and well known.

In its general organization, my improved rim operating tool comprises means for holding one end of the rim adjacent to the split therein and the diametrically opposite part of the same against movement while another part engages with the rim adjacent to the opposite side of this split and moves the same radially relatively to the other parts of the rim for the purpose of breaking the joint between the split ends of the rim and thus permit the same to be contracted and the tire to be easily removed and re-applied.

In the preferred embodiment of this invention, the rim retaining means comprise two retaining members or hooks 6, 7, each of which is adapted to engage its outer bill or beak 8 with the outer edge of one of the rim flanges, while its inner heel 9 is adapted to engage with the inner side of the adjacent portion of the body of the rim. 10, 11 represent two adjusting bars which carry the retaining hooks or members 7, 6 at their outer ends and are preferably formed integrally therewith of metal or other suitable material. One of these adjusting bars, for instance the bar 10, is provided at its inner end with a guide 12 which is preferably constructed in the form of a loop in which the other adjusting bar 11 slides lengthwise for the purpose of telescoping these bars relatively to each other and shifting the retaining hooks at their outer ends either inwardly or outwardly for adapting the same to a particular size of wheel rim and also clamping the tool thereto. This longitudinal adjustment of these bars and the retaining hooks thereon may be effected by a variety of means but those shown in the drawings are simple, efficient and capable of being easily operated and therefore preferred. As shown in Figs. 1, 3 and 4, this adjusting means comprises two stops 13, 13 having the form of perforated lugs which are arranged on the adjusting bar 10 intermediate of its ends, a screw rod 14 connected at one end with the inner end of the adjusting bar 11 and passing through the openings of the perforated lugs 13, and an adjusting screw nut or sleeve 15 mounted on the screw rod between the stop lugs, so as to be free to turn but incapable of endwise movement. Upon turning this screw nut or sleeve in one direction or the other, the screw rod will be moved lengthwise of the adjusting bar 10, thereby causing the two adjusting bars to be moved lengthwise relatively to each other together with the retaining hooks on the outer ends thereof. The adjusting screw nut may be turned by any suitable means, for instance, by means of a handle 17 provided at one end with a pin 18 which may be engaged successively with openings 16 arranged in an annular row on the periphery of the screw sleeve for turning the latter step by step by shifting the same from one opening to another and then swinging the handle as far as necessary. The opposite end of the handle is preferably provided with a screw driver 19 which may be used to manipulate the tire for removing the same from the rim or restoring the same thereto, as well as for other purposes. The handle 17 is preferably made of wood and the pin 18 and screw driver 19 are preferably made at opposite ends of the same rod of metal which extends through this handle.

20 represents a shifting member or hook which is similar to the hooks 6, 7, and provided at its outer end with a bill or beak 21 which is adapted to engage with the outer edge of a rim flange adjacent to that side of the split or joint 2 opposite to the place where a rim-flange is engaged by the hook 7, and an inner heel 22 which engages the inner side or bore of the rim in line with the part which is engaged by a companion bill 21. This shifting hook or member is arranged at the outer end of a shifting bar 23 and preferably formed integrally therewith of metal, this bar being preferably arranged parallel with or substantially so, and at one side of the adjusting bars 10, 11. A longitudinal movement is imparted to this shifting bar and its hook and in a direction lengthwise of the adjusting bars and the hooks thereon by means which preferably comprise a shifting lever 24 pivoted at its inner end by a pin 25 on a lug 27 projecting laterally from the adjusting bar 10, and a pivot pin 26 or the like connecting the inner end of the shifting bar with the shifting lever at a distance from the fulcrum of the latter.

In using this tool, the adjusting bars are first shifted lengthwise relatively to each other so as to permit the bearing member 6 to be engaged with a flange of the rim at a point substantially diametrically opposite to the joint or split 2 of the rim while the other hook 7 is engaged with this flange of the rim adjacent to one side of the split thereof, as shown in Figs. 2 and 3. After this the screw sleeve is turned so as to tighten or clamp these hooks on the rim, whereby one-half of the latter will be reliably held in its normal position against radial displacement. The other hook 20 is now engaged with the same flange of the rim adjacent to the split 2 but on that side thereof opposite to where the rim is engaged by the corresponding retaining hook 7, as shown in Fig. 2. The hand lever 24 is now turned from its outer position shown by full lines in Fig. 2 inwardly toward the adjusting bars to the position shown by dotted lines in this figure, thereby causing the free end of the wheel-rim to be shifted from the position shown by full lines in Fig. 2 inwardly to the position shown by dotted lines in the same figure. The split ends of the rim are now disengaged or unlocked from each other so that the natural resilience of the rim, which is usually constructed of spring metal, causes the same to contract sufficiently to permit the shoe and associated parts of the tire to be easily and quickly removed therefrom. Upon swinging the hand lever 24 from its inoperative position shown by full lines in Fig. 2 to its operative position shown by dotted lines in the same figure, and against the adjacent adjusting bar 10, the free outer end of this lever will pass beyond the fulcrum 25 of this lever. In other words, a line drawn from the hook 20 to the handle of the lever 24 will be arranged between the fulcrum 25 of this lever and the adjacent adjusting bar 10, so that the resilience of the free end of the wheel rim will tend to lock this handle in this position. By this means the wheel-rim will remain in its contracted position with the rim-operating tool applied thereto and thereby facilitate the operation of re-applying the tire to the wheel-rim. After the tire has been placed around the contracted wheel rim, the hand lever 24 is swung outwardly from the position shown by dotted lines to the position shown by full lines in Fig. 2, thereby forcing the free end of the wheel rim outwardly into its normal position in line with the immovable free end thereof and thereby permit the ends of the rim to be again interlocked preparatory to applying the rim to the felly of the wheel intended to receive it. Thereafter this tool may be removed from the rim by turning the screw sleeve sufficiently in the proper direction to loosen the grip of the retaining members 6, 7, from the flange of the rim.

When in its normal operative condition after being adjusted to a rim of a particular size the hooks 6 and 7 and parts associated therewith are practically immovable relatively to each other and form a rigid strut diametrically across the rim, thus maintaining the fulcrum of the lever 24 at a fixed point while contracting and expanding the rim.

This tool is comparatively simple in construction, it contains but few parts, which can be manufactured at low cost, and it can be folded compactly so as to permit of easily stowing the same away with other automobile tools ready for use when required. Furthermore, the operation of removing a tire and re-applying the same by the use of this rim tool can be effected very quickly and conveniently and thus reduce to a minimum the labor usually attending this work.

I claim as my invention:

1. A tool for operating split wheel rims comprising a normally rigid lengthwise adjustable bar adapted to extend diametrically across the rim and provided at its opposite ends with two coupling devices one of which is adapted to engage with the rim adjacent to one side of its split and the other with the diametrically opposite part of the rim to either push or pull, and rim shifting means mounted on said bar and adapted to engage the rim adjacent to the other side of its split and movable in a direction substantially parallel with said bar.

2. A tool for operating split wheel rims comprising a normally rigid bar adapted to extend diametrically across the rim and provided at its opposite ends with two coupling devices one of which is adapted to engage with the rim adjacent to one side of its split and the other with the diametrically opposite part of the rim, and rim shifting means comprising a lever pivoted on the central part of said bar and a shifting link pivoted on said lever and having a coupling device adapted to engage with said rim adjacent to the other side of its split, each of said coupling devices having an inner face arranged parallel with the axis of the rim and adapted to engage the inner side of the rim and an outer hook adapted to engage with a flange of the rim.

JAMES S. PORTER.